(12) United States Patent
Pike et al.

(10) Patent No.: US 12,103,067 B2
(45) Date of Patent: Oct. 1, 2024

(54) METHOD OF MANUFACTURING A COLD BOX CORE

(71) Applicant: Mueller International, LLC, Atlanta, GA (US)

(72) Inventors: Andrew Henderson Pike, Ooltewah, TN (US); Joel Clinton Busler, Fyffe, AL (US); Jason White Bradley, Soddy-Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 217 days.

(21) Appl. No.: 17/900,253

(22) Filed: Aug. 31, 2022

(65) Prior Publication Data

US 2022/0410255 A1 Dec. 29, 2022

Related U.S. Application Data

(62) Division of application No. 16/742,562, filed on Jan. 14, 2020, now Pat. No. 11,458,532.

(51) Int. Cl.
| | |
|---|---|
| *B22C 9/10* | (2006.01) |
| *B22C 9/12* | (2006.01) |
| *B33Y 40/20* | (2020.01) |
| *B33Y 80/00* | (2015.01) |
| *B33Y 10/00* | (2015.01) |

(52) U.S. Cl.
CPC ............... *B22C 9/10* (2013.01); *B22C 9/123* (2013.01); *B33Y 40/20* (2020.01); *B33Y 80/00* (2014.12); *B33Y 10/00* (2014.12)

(58) Field of Classification Search
CPC ............ B22C 9/10; B22C 9/123; B33Y 40/20
See application file for complete search history.

(56) References Cited

U.S. PATENT DOCUMENTS

| | | |
|---|---|---|
| 11,458,532 B2 | 10/2022 | Pike et al. |
| 2021/0213513 A1 | 7/2021 | Pike et al. |
| 2021/0370552 A1 | 12/2021 | Waldestrand et al. |

FOREIGN PATENT DOCUMENTS

DE 2557193 6/1977

OTHER PUBLICATIONS

Artec; Article entitled: "Reverse engineering a Formula 1 car and 3D printing a mini copy", located at <https://www.artec3d.com/cases/3d-scanning-for-reverse-engineering>, accessed on Sep. 26, 2019, 10 pgs.
Bigrep; Article entitled: "Advanced Applications: Molds & Tooling—Large Scale 3D Printing", Oct. 25, 2017, 8 pgs.

(Continued)

*Primary Examiner* — James Sanders
(74) *Attorney, Agent, or Firm* — Taylor English Duma LLP (57) ABSTRACT

A method of manufacturing a cold box core includes injecting unbonded sand into a cold box core tool, the unbonded sand including sand mixed with a resin, the cold box core tool including: a first platen; a first insert half secured to the first platen; a second platen; and a second insert half secured to the second platen and configured to alternately mate with and separate from the first insert half, each of the first insert half and the second insert half being three-dimensionally printed from a polymer material, the first insert half and the second insert half together forming a cavity therebetween defining an outer geometric shape of the cold box core; and injecting gas into the unbonded sand to harden the cold box core.

14 Claims, 4 Drawing Sheets

(56) References Cited

OTHER PUBLICATIONS

Boissonneault, Tess; Article entitled: "Local Motors installs massive LSAM composite 3D printer to manufacture autonomous Olli shuttle", Jul. 3, 2018, 4 pgs.
Dorfmueller, et al.; Article entitled: "Cold Box Process—Research to Reality", 36th IFC Exchange Paper, Published 1970, 6 pgs.
Laempe Product Guide, publicly available prior to Jan. 14, 2020, 2 pgs.
Laempe; Brochure for the L Core Shooter Series One for All: the Universal, Adaptable All-Rounder, publicly available prior to Jan. 14, 2020, 2 pgs.
Pike, Andrew Henderson; Non-Final Office Action for U.S. Appl. No. 16/742,562, filed Jan. 14, 2020, mailed Feb. 28, 2022, 14 pgs.
Pike, Andrew Henderson; Notice of Allowance for U.S. Appl. No. 16/742,562, filed Jan. 14, 2020, mailed Jun. 13, 2022, 11 pgs.
Pike, Andrew Henderson; Requirement for Restriction/Election for U.S. Appl. No. 16/742,562, filed Jan. 14, 2020, mailed Jan. 6, 2022, 7 pgs.
Saunders, Sarah; Article entitled: "Thermwood & Purdue: 3D Printed Composite Molds to Make Compression Molding Parts", Nov. 13, 2019, 6 pgs.
Wilson, et al.; Article entitled: "Basic Construction of Cold Box Process Core Box", AFS Transactions, Published 1971, 4 pgs.
Love, Lonnie J.; Article entitled: "Cincinnati Big Area Additive Manufacturing (BAAM)", Oak Ridge National Laboratory, Mar. 2015, 21 pgs.
Coykendall, et al; Article entitled: "3D opportunity in aerospace and defense: Additive manufacturing takes flight"; Deloltte University Press, Copyright 2014, 28 pgs.
Curran, Scott; Article entitled: Big Area Additive Manufacturing and Hardware-in-the-Loop for Rapid Vehicle Powertrain Prototyping: A Case Study on the Development of a 3-D-Printed Shelby Cobra, Feb. 1, 2016, 11 pgs.
Thermwood; Article entitled: "LSAM—Large Scale Additive Manufacturing", located at <http://www.thermwood.com/lsam_home.htm>, accessed on Sep. 26, 2019, 7 pgs.
Wetzel, Shannon; Article entitled: "Jump-Start Tooling with 3-D Printing", Metal Casting Design & Purchasing, Nov./Dec. 2017, 4 pgs.

METHOD OF MANUFACTURING A COLD BOX CORE

REFERENCE TO RELATED APPLICATIONS

This application is a divisional of U.S. application Ser. No. 16/742,562, filed Jan. 14, 2020, which is hereby specifically incorporated by reference herein in its entirety.

TECHNICAL FIELD

Field of Use

This disclosure relates to cold box core tools and core-making and casting processes more generally. More specifically, this disclosure relates to three dimensionally printed cold box core tool insert halves.

Related Art

Casting is a relatively old but still versatile manufacturing process used to manufacture a wide variety of cast parts, the surface geometries of which can require the use of specially formed "cores." Tooling used to produce cores, which are destroyed in the casting process, can be quite expensive due to the time-intensive processes available for their fabrication.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a method of manufacturing a cold box core, the method comprising: injecting unbonded sand into a cold box core tool, the unbonded sand comprising sand mixed with a resin, the cold box core tool comprising: a first platen; a first insert half secured to the first platen; a second platen; and a second insert half secured to the second platen and configured to alternately mate with and separate from the first insert half, each of the first insert half and the second insert half being three-dimensionally printed from a polymer material, the first insert half and the second insert half together forming a cavity therebetween defining an outer geometric shape of the cold box core; and injecting gas into the unbonded sand to harden the cold box core.

In a further aspect, disclosed is a method of manufacturing a cold box core tool, the method comprising: printing a first insert half using a three-dimensional printer; and printing a second insert half using the three-dimensional printer.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the cold box core tool nearest to a loading entrance of the tool; "rear" is that end of the tool that is opposite or distal the front; "left" is that which is to the left of or facing left from a person facing towards the front; and "right" is that which is to the right of or facing right from that same person while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, a cold box core tool and associated methods, systems, devices, and various apparatuses are disclosed herein. In one aspect, the cold box core tool can comprise an insert comprising three-dimensionally printed insert portions, which can be insert halves.

Casting is a relatively old but still versatile manufacturing process used to manufacture a wide variety of items—often but not exclusively from a metal material. For example, casting can be used to manufacture very strong and durable parts for valves used in a fluid distribution system from a material such as, for example and without limitation, ductile iron. Some parts of such valves can have various surface geometries. Such surface geometries can define, for example and without limitation, internal cavities and/or undercuts, such as fluid paths through the valves, not able to be cast inside a typical casting tool without specially formed "cores." Such cores, when properly supported inside the casting tool, can occupy spaces reserved for the cavities of the finished cast part. Each core can be made hard enough to maintain its shape during the process of pouring or injecting molten metal into cavities of the casting tool. At a desirable point in the manufacturing process—such as after hardening of the molten metal inside the cavities of the casting tool—a material forming the core can be flushed from the part during a "shake-out" process. Typically, the heat from the cast part causes resin to bake out of the previously rigid core until the core becomes loose sand. The cast part can then optionally be further cleaned of sand residue and any other residue by a shot-blasting process. The core, in essence, can function as a sacrificial element of the casting process facilitating cost-effective fabrication of a variety of geometrically accurate parts.

Figure 1:
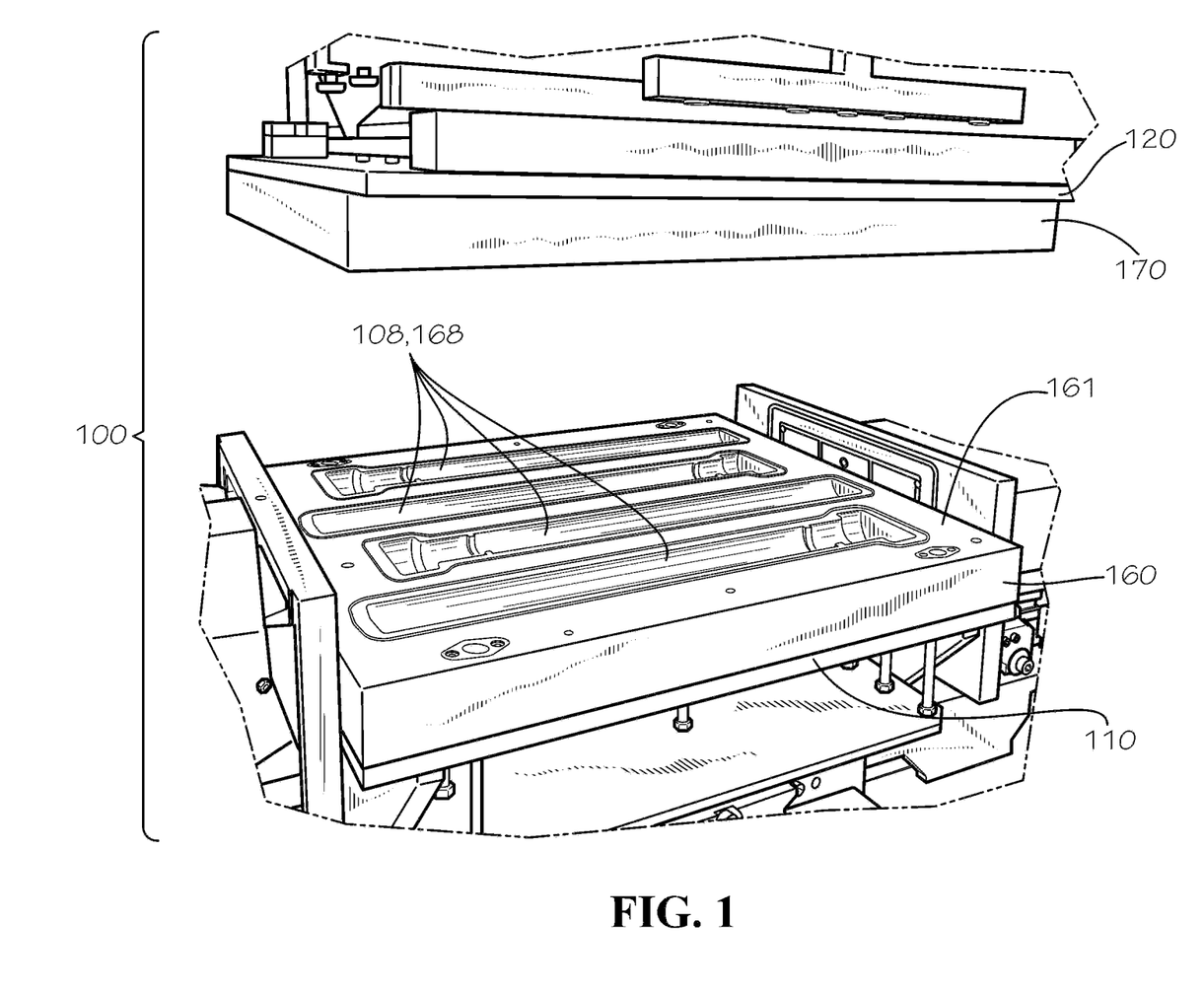
FIG. 1 is front perspective view of a cold box core tool in an open position in accordance with one aspect of the current disclosure.

FIG. 1 shows one aspect of a cold box core tool 100 for manufacturing cold box cores 200 (shown in FIG. 2), which can be sand cores. Shown in an open position and without the manufactured cold box cores 200, the tool 100 can comprise a first platen 110 and a second platen 120. Each of the platens 110,120 can be or can be incorporated into a pedestal, a carriage, or a truck of a larger machine comprising the cold box core tool 100. The tool 100 can comprise a first insert half 160, which can be secured to the first platen 110; and a second insert half 170, which can be secured to the second platen 120. Each of the first platen 110 and the second platen 120 can be a flat plate, which can be formed from a metal such as steel or from any other suitably rigid and strong material.

The first insert half 160 can define an inner surface 161 defining a first cavity portion 168, and the second insert half 170 can define an inner surface (not shown) defining a second cavity portion (not shown). The first cavity portion 168 and the second cavity portion can together form a cavity 108 defining an outer geometric shape of the cold box cores 200. As shown, the cavity 108 can define a plurality of individual cavities for producing a plurality of cold box cores 200 or core blanks in a single operating cycle of the tool 100. The second insert half 170 can be configured to alternately mate with (in a closed position of the tool 100 not shown) and, in the open position shown, separate from the first insert half 160. In some aspects, as shown, a separation plane or primary parting line defined between the first insert half 160 and the second insert half 170 of the core box core tool 100 can be oriented in a horizontal plane, in which case the core box core tool 100 can be described as a horizontal core box. In other aspects, the separation plane or primary parting line of the core box core tool 100 can be oriented in a vertical plane, in which case the core box core tool 100 can be described as a vertical core box. In some aspects, the separation plane or primary parting line of the core box core tool 100 can be angled with respect to both the horizontal and the vertical planes.

In a typical cold box core tool, the first insert half 160 and the second insert half 170 are made using traditional subtractive manufacturing processes and are typically formed from any one of the following materials: a metal such as steel or cast iron, a wood, or a polymer such as polyurethane—sometimes referred to as "red board" because it is often red in color and is sold in various sizes of boards. These and any other suitable materials can, however, be quite expensive to obtain, at least in sizes sufficient to produce the tooling insert halves 160,170. Moreover, a machining time or a "spindle time" during which sections of the tool are being cut and an overall machine time and human labor including set-up and breakdown required to produce the insert halves 160,170 using a subtractive manufacturing process with a machine such as a multi-axis machining center can become a significant portion of the cost of the cold box core tool or the cold box cores 200 or both. Significant factors in this cost can include the amount of material that needs to be removed from such a block or board, the translational speed of the tool head being limited by a maximum rate at which the tool bits can cut and remove the material, and the specialized nature of the tool requiring some level of manual supervision by a skilled operator. Availability of only certain board sizes can mean that some tools made using traditional processes and materials are necessarily made from a stack-up of several boards defining joints therebetween across the insert halves 160,170. In some aspects, it can be necessary for much of the original block to be machined away to reach even a near-net shape. In any case, while the cores 200 are a helpful element of the casting process, the cores 200 are essentially destroyed by the end of the process and so it can be beneficial to minimize the cost of making them.

Moreover, not only the cost of making a single set of insert halves 160,170 but also the longevity of the fabricated insert halves 160,170 must be considered to understand the total cost of the tooling. While all of the materials traditionally used can be expensive from a labor and material standpoint, the "redboard" or polyurethane tooling typically can last only about 1,000 "shots" or core production cycles, if that, and dense wood or wood-product tooling typically can last only about 10, 50, or 100 shots. In contrast, the three-dimensionally printed core box core tool 100 defining a cavity for tensile bar samples has been successfully tested through over 1,000 shots without failure or even noticeable degradation. This practically means that the three-dimensionally printed cold box core tool 100 can not only last longer than the traditional polyurethane tooling but can over its life yield even greater savings based on how many sets of the replacement tool 100 it can effectively replace (in comparison to the replacement tool 100 being manufactured from traditional processes together with traditionally used materials). It is possible, for example, to save approximately 33% or more on a turnkey tool 100 using the three-dimensionally printed insert halves 160,170 before even considering lifetime savings. While using a metal such as aluminum or steel for the insert halves 160,170 can result in a tool lasting much longer than a tool formed from redboard, the cost of such a tool will generally also be even greater.

Even though polyurethane used in redboard tooling is a polymer, as disclosed herein a polymer used to form the insert halves 160,170 can comprise carbon fibers defining a carbon-fill percentage of approximately 20% or more. In addition, as will be described a three-dimensionally printed insert halves 160,170 can be formed as a monolithic structure without any seams or joints, which as described above can be formed during the stack-up of materials using traditional manufacturing processes and materials.

In contrast to the typical methods and materials described above, each of the first insert half 160 and the second insert half 170 can be three-dimensionally printed. While three-dimensional printing has generally been a viable option for additive manufacturing of small parts for at least cosmetic design review purposes for well over ten years and three-dimensional printers are now even available to hobbyists from so-called "big-box" retailers, three-dimensional printing of larger parts and parts experiencing mechanical loads during use has been a newer development. Three-dimensional printing of tooling is an even newer development, as tooling such as that used in the manufacture of the cold box cores 200 can be subject to compression forces measuring several tons, if not 20 tons or more during clamping of the insert halves 160,170. For example and without limitation, initial tests of the three-dimensionally printed core box tool 100 were run on a machine rated at 25,000 dekanewtons or just over 56,000 pounds of clamping force. Even where crush force calculations suggested that a three-dimensionally printed tool could potentially work, such calculations also suggested that such a tool may not work and attempts at the fabrication of three-dimensionally printed tools using previously developed and known methods to specifically produce a core box core tool that have been attempted or witnessed by those associated with the current disclosure have resulted in catastrophic failure. In these failed attempts, a thermoplastic commonly used by three dimensional printers and known as polylactic acid (PLA) was used. Purportedly successful uses of three-dimensionally printed tools have been for different manufacturing processes not involving the same stresses involved in cold box core making.

For example, while noting that sandblasting is a process typically used to remove material from the surface of a part or other structure, the process of infusing the sand-resin mixture into the cavity 108 of the tool 100 is in one sense equivalent to sandblasting of the cavity 108 at exemplary pressures of 45-90 pounds per square inch (PSI), which is a similar pressure to that used during a typical sandblasting process. Yet wear resistance was surprisingly good, i.e. degradation of the tool was within acceptable limits even after the aforementioned thousands of core production cycles.

In some aspects, each of the insert halves 160,170 can more specifically be three dimensionally printed from a polymer material such as, for example and without limitation, acrylonitrile butadiene styrene (ABS). In other aspects, another polymer material can be used. In some aspects, either or both of the first insert half 160 and the second insert half 170 can comprise a carbon fiber in-fill of between 20 percent and 30 percent, inclusive, by weight. In some aspects, either or both of the first insert half 160 and the second insert half 170 can comprise a carbon fiber in-fill of 20 percent, inclusive, by weight. In some aspects, either or both of the first insert half 160 and the second insert half 170 can comprise a carbon fiber in-fill of 25 percent, inclusive, by weight. In some aspects, either or both of the first insert half 160 and the second insert half 170 can comprise a carbon fiber in-fill of 30 percent, inclusive, by weight. In some aspects, either or both of the first insert half 160 and the second insert half 170 can comprise a carbon fiber in-fill outside of the range of 20 percent to 30 percent, inclusive, by weight, if desired based on the circumstances and desired properties, if experimentation proves the final product is acceptable. While not necessarily appreciated in the current context of cold box core making and tool or die making generally, adding fibers to a polymer resin such as ABS before molding has in the past generally been found to provide reinforcement and strength to certain polymers.

Three dimensional printing such as, for example and without limitation, the specific form disclosed herein can be performed on an additive manufacturing machine such as, for example and without limitation, one of the LSAM machines produced by Thermwood Corporation of Dale, Indiana, U.S.A. (where "LSAM" is also short for "large scale additive manufacturing"), or one of the BAAM machines produced by Cincinnati Incorporated of Harrison, Ohio, U.S.A. (where "BAAM" is also short for 'big area additive manufacturing").

Figure 2:
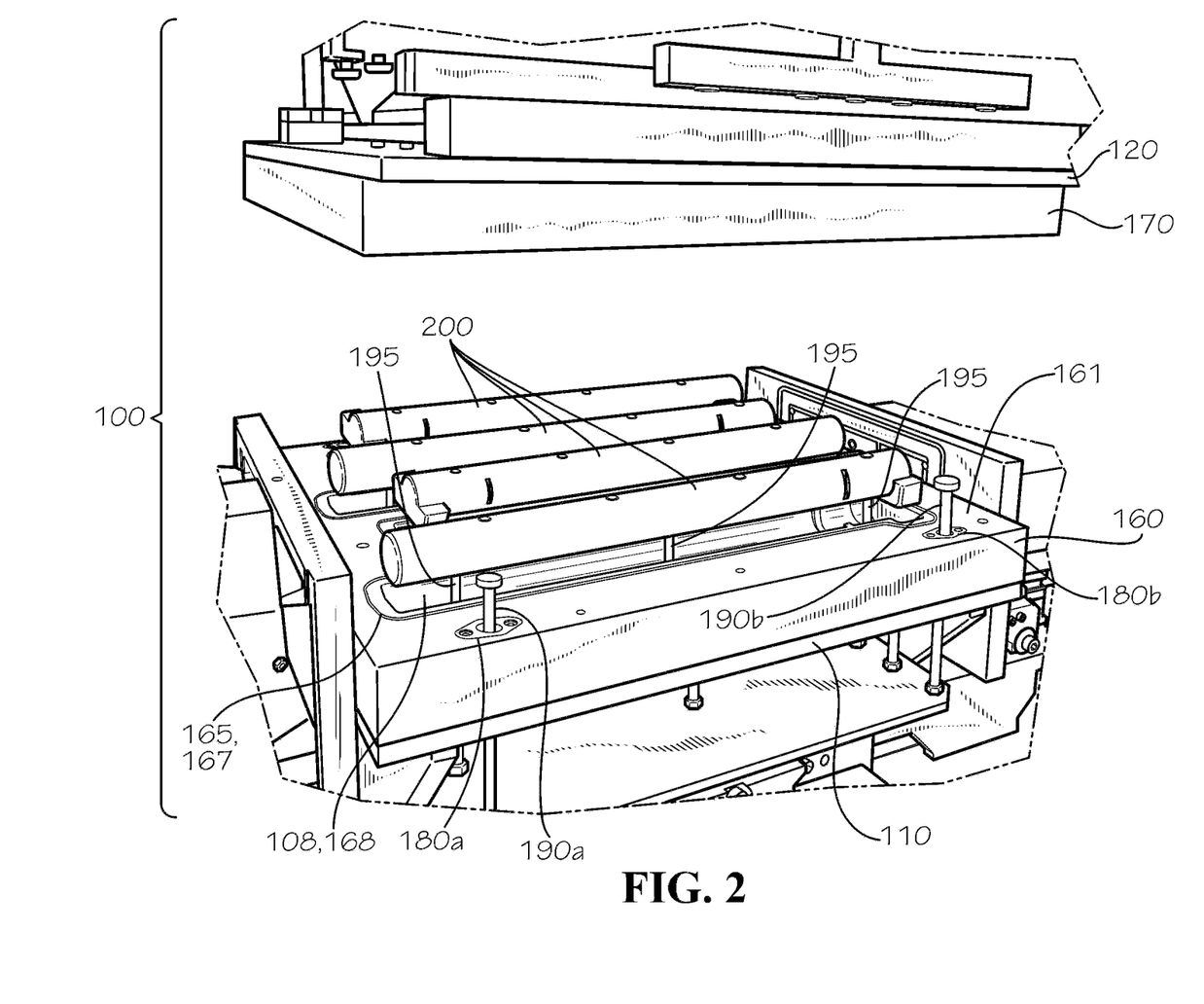
FIG. 2 is a front perspective view of the cold box core tool of FIG. 1 showing cold box cores positioned inside the tool.

Each of the insert halves 160,170 can be secured to the respective platens 110,120 by fasteners (not shown). In some aspects, the insert half 170 can be aligned with the insert half 160 during movement of the tool 100 from an open position to the closed position or proximate to the closed position with geometric features such as, for example and without limitation, pins 190*a,b* extending from the insert half 160 towards the insert half 170. In some aspects, the insert half 170 can be aligned with the insert half 160 during movement of the tool 100 from an open position to the closed position or proximate to the closed position by actuators of the system configured to selectively adjust and maintain a position of the insert half 170 with respect to a position of the insert half 160. A gasket or seal 167 can be positioned inside grooves 165 defined in either the insert half 160 or the insert half 170 to provide a tight seal proximate to and extending around a perimeter of each of the cavities 108 for forming the cold box cores 200. The pins 190a,b can be return pins for returning ejector pins 195 to their positions during forming of the cores 200, in which case the lowering insert half 170 upon contact with the pins 190a,b sufficient to cause a downwards vertical movement of the pins 190a,b can simultaneously lower the ejector pins 195. As shown, the ejector pins 195 are supporting the cores 200 above the cavities 108 for easier removal. As shown, each of the pins 190a,b can be positioned inside bushings 180a,b installed in the insert halves 160,170. Each of the ejector pins 195 can likewise be positioned inside bushings (not shown) installed in the insert halves 160,170. Such bushings can facilitate smooth movement of the pins 190a,b, and the ejector pins 195 and reduce wear on the insert halves 160,170.

As noted above, only a fraction of the material used to produce the insert halves 160,170 using the traditional subtractive manufacturing methods typically remains as part of the finished tool 100 after the machining process is complete, and the time and material used in the process is ultimately neither avoidable nor recoverable. In contrast, three dimensional printing of the insert halves 160,170 can be done with only enough material to produce a "near net" shape. The near net shape can be made slightly larger in each direction such that light machining to remove an outermost portion of the tool 100 can bring the tool 100 to its finished shape.

Figure 3:
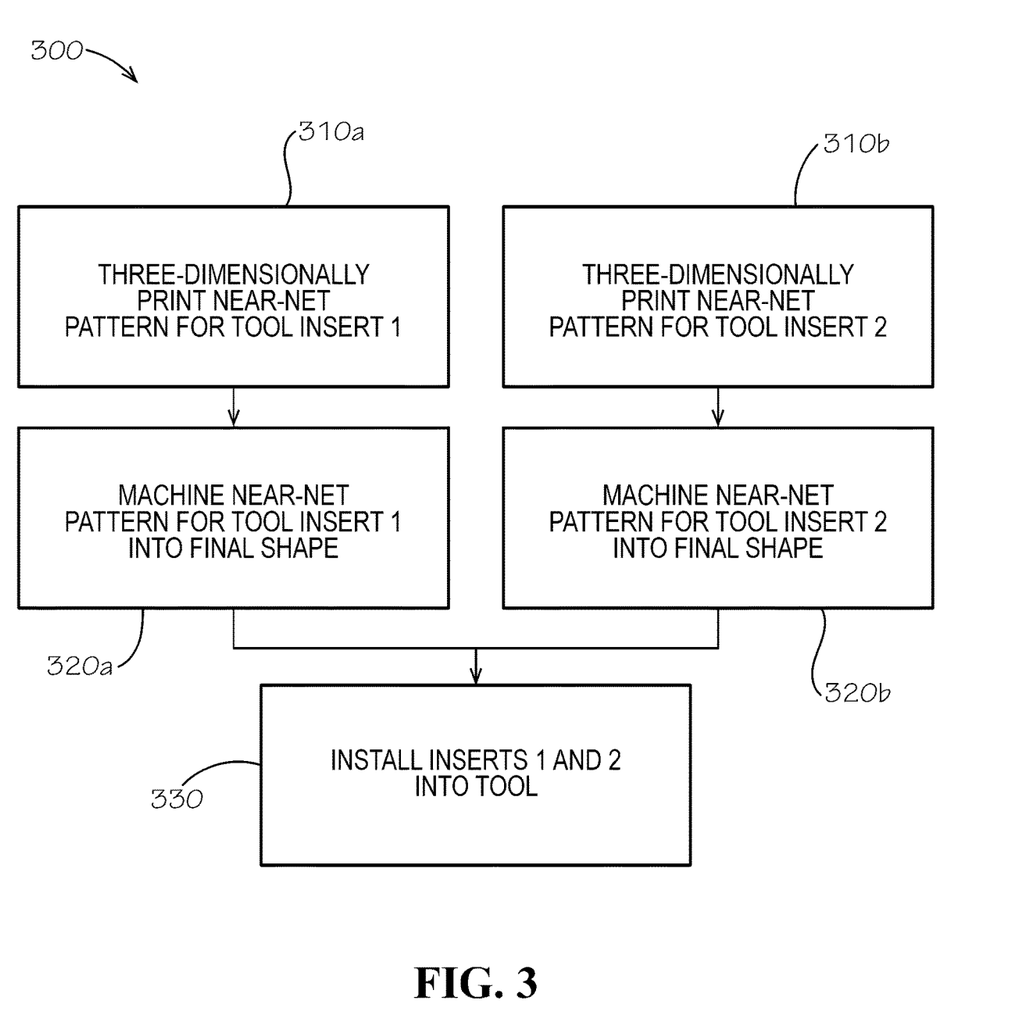
FIG. 3 is a flowchart describing a method of manufacturing the cold box core tool of FIG. 1.

As shown in FIG. 3, a method 300 of manufacturing the cold box core tool 100 can comprise one or more of a series of steps 310a,b through 330. The method 300 can comprise printing each of the first insert half 160 and the second insert half 170 using a three-dimensional printer (not shown). As shown in respective steps 310a,b, printing the first insert half 160 can comprise printing a first near-net shape insert half using the three-dimensional printer, and printing the second insert half 170 can comprise printing a second near-net shape insert half using the three-dimensional printer. The method 300 can further comprise securing the first insert half 160 to the first platen 110 of the cold box core tool 100 and securing the second insert half 170 to the second platen 120.

As shown in step 320a, the method can further comprise trimming the first near-net shape insert half so that the first near-net shape becomes the first insert half 160 defining the first cavity portion 168. Similarly, as shown in step 320b, the method can further comprise trimming the second near-net shape insert half so that the second near-net shape insert half becomes the second insert half 170 defining the second cavity portion 178. Such trimming can be done with a machine such as, for example and without limitation, a CNC router. The first cavity portion 168 and the second cavity portion 178 can together form the cavity 108 defining an outer geometric shape of the cold box core 200 that the cold box core tool 100 is configured to produce.

Trimming the first insert half 160 can comprise cutting a plurality of first alignment bushing openings 188, which can upon assembly of the cold box core tool 100 receive the bushings 180a,b; and trimming the second insert half 170 can comprise cutting a plurality of second alignment bushing openings (not shown). In some aspects, trimming can comprise the machining or formation during the three dimensional printing process of vents extending through the insert halves 160,170 to facilitate flow of the sand mixture into the cavities 108 during forming of the cores 200. Other features can be formed into the insert halves 160,170 as desired just as they might be formed into the insert halves 160,170 when formed from the aforementioned traditional subtractive manufacturing processes.

Between the steps 320a,b and a step 320, the method can further comprise positioning a first alignment bushing in each of the plurality of first alignment bushing openings of the first insert half 160; and positioning a second alignment bushing in each of the plurality of second alignment bushing openings of the second insert half 170.

The step 320 can comprise installing the insert halves 160,170 (identified in FIG. 3 as inserts 1 and 2) into the surrounding structure of the cold box core tool 100. A machine able to receive the platens 110,120 and the insert halves 160,170 can be, for example and without limitation, the L-series "core shooters" available from Laempe Reich of Trussville, Alabama. For example and without limitation, the Laempe Reich model LL20 machine or the Laempe Reich model LFB25 can be used.

Figure 4:
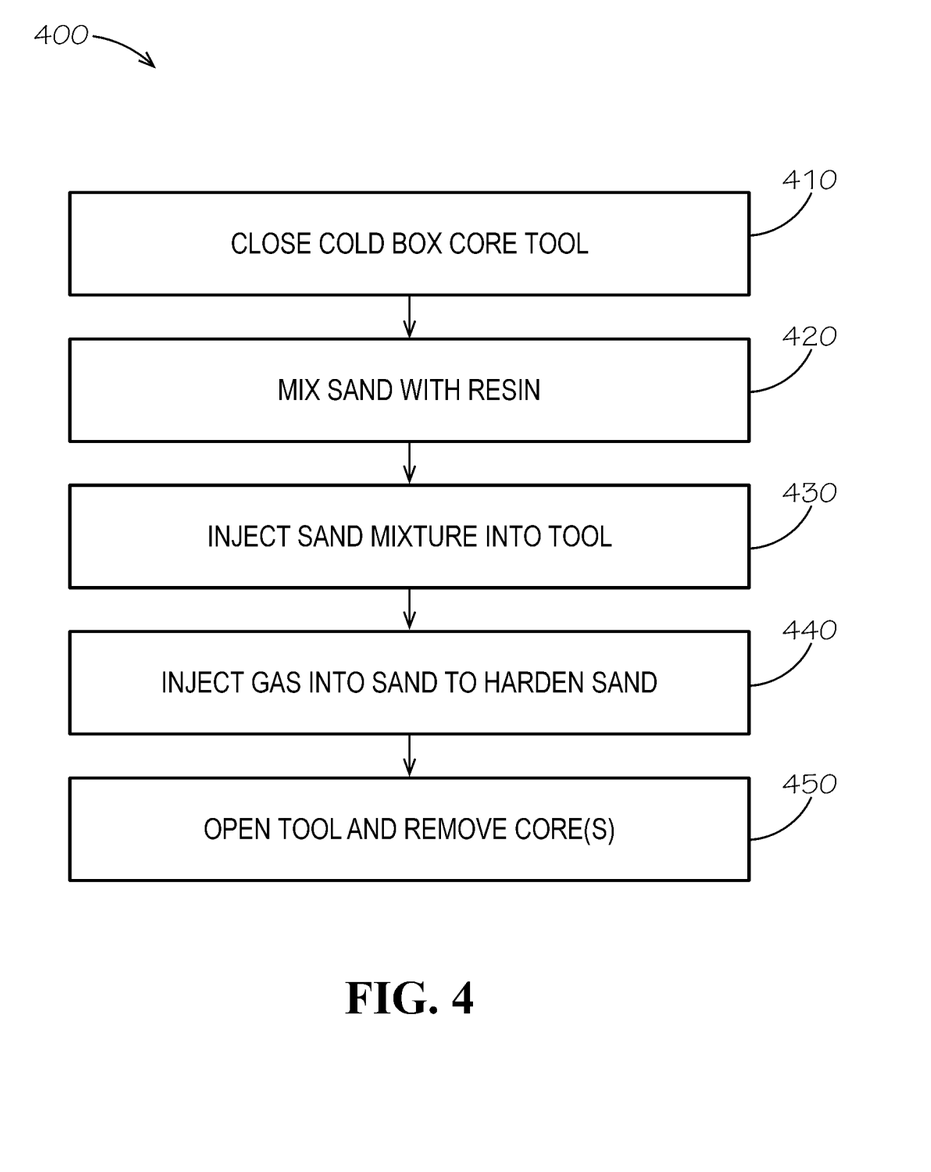
FIG. 4 is a flowchart describing a method of manufacturing a cold box core using the cold box core tool of FIG. 1.

As shown in FIG. 4, a method 400 of manufacturing the cold box core 200 can comprise one or more of a series of steps 410 through 450. Notably, none of the steps of the manufacturing process for the cold box core 200 requires heat, hence the "cold" in the name of the tool 100. In other words, the core box core 200 can be manufactured as described herein at ambient or room temperature or without with addition of heat. As shown in step 410, the method 400 can comprise closing the core box core tool 100. As shown in step 420, the method 400 can comprise mixing sand with resin to create an unbonded sand mixture. For example and without limitation, the resin can be a phenolic-urethane resin. As shown in step 430, the method 400 can comprise injecting the unbonded sand mixture into the cold box core tool 100. In some aspects, a pressure of the unbonded sand during its injection into the cold box core tool 100 can measure in a range between 45 pounds per square inch (PSI) and 90 PSI or about 6 bar. In some aspects, the pressure of the unbonded sand during its injection into the cold box core tool 100 can measure outside of the range between 45 and 90 PSI. In some aspects, the pressure of the unbonded sand during its injection into the cold box core tool 100 can measure in a range between 60 and 70 PSI. At pressures within these ranges, as noted above, the injection of the unbonded sand into the cold box core tool 100 can simulate a harsh sandblasting of the cavity 108 of the cold box core tool 100. As shown in step 440, the method 400 can further comprise injecting gas into the unbonded sand to harden the cold box core(s) 200. For example and without limitation, the gas can be an amine gas. In other aspects, another resin and another gas such as carbon dioxide can be used. As shown in step 450, the method 400 can comprise opening the cold box core tool 100 and removing the cold box core(s) 200. This process can, for example and without limitation, have a cycle time of approximately 45 seconds.

The process of forming the cold box core 200 disclosed herein can be considered a form of transfer molding. Transfer molding differs from compression molding, another process, in that the mold remains closed during the molding process. Moreover, the process described herein involving the injection of a sand-resin mixture into the cold box core tool 100 can create abrasion forces acting on the insert halves 160,170 that are not present in a compression molding process.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of manufacturing a cold box core, the method comprising:
   injecting unbonded sand into a cold box core tool, the unbonded sand comprising sand mixed with a resin, the cold box core tool comprising:
   a first platen;
   a first insert half secured to the first platen;
   a second platen; and
   a second insert half secured to the second platen and configured to alternately mate with and separate from the first insert half, each of the first insert half and the second insert half being three-dimensionally printed from a polymer material and having a near-net shape and being trimmed with a CNC router, the first insert half and the second insert half together forming a cavity therebetween defining an outer geometric shape of the cold box core; and
   injecting gas into the unbonded sand to harden the cold box core.

2. The method of claim 1, wherein each of the first insert half and the second insert half is formed from acrylonitrile butadiene styrene (ABS).

3. The method of claim 2, wherein each of the first insert half and the second insert half comprises a carbon fiber in-fill of between 20 percent and 30 percent, inclusive, by weight.

4. The method of claim 1, further comprising three-dimensionally printing each of the first insert half and the second insert half using a large scale additive manufacturing machine.

5. The method of claim 1, wherein each of the first insert half and the second insert half defines a monolithic structure.

6. The method of claim 1, wherein the resin is phenolic-urethane resin.

7. The method of claim 1, wherein the first insert half defines a first cavity portion at least in part forming the cavity defining the outer geometric shape of the cold box core.

8. The method of claim 1, wherein the first insert half defines a first cavity portion and the second insert half defines a second cavity portion, the first cavity portion and the second cavity portion together forming the cavity defining the outer geometric shape of the cold box core.

9. The method of claim 1, wherein the method is performed at ambient temperature without heating the tool.

10. The method of claim 1, wherein the gas is amine gas.

11. The method of claim 1, wherein the gas is carbon dioxide gas.

12. The method of claim 1, wherein injecting the unbonded sand into the cold box core tool results in a pressure of the unbonded sand measuring in a range between 45 PSI and 90 PSI, inclusive.

13. The method of claim 12, wherein injecting the unbonded sand into the cold box core tool results in the pressure of the unbonded sand measuring in a range between 60 PSI and 70 PSI, inclusive.

14. The method of claim 1, wherein a cycle time is less than or equal to approximately 45 seconds.

* * * * *